(12) United States Patent
Taghavi Nasrabadi et al.

(10) Patent No.: US 9,191,923 B2
(45) Date of Patent: Nov. 17, 2015

(54) SYSTEMS AND METHODS FOR RANGE EXTENSION OF WIRELESS COMMUNICATION IN SUB GIGAHERTZ BANDS

(75) Inventors: Mohammad Hossein Taghavi Nasrabadi, San Diego, CA (US); Hemanth Sampath, San Diego, CA (US); Vincent K. Jones, IV, Redwood City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 670 days.

(21) Appl. No.: 13/447,149

(22) Filed: Apr. 13, 2012

(65) Prior Publication Data

US 2012/0263107 A1 Oct. 18, 2012

Related U.S. Application Data

(60) Provisional application No. 61/475,814, filed on Apr. 15, 2011.

(51) Int. Cl.
*H04W 4/00* (2009.01)
*H04W 72/02* (2009.01)
*H04L 1/00* (2006.01)
*H04L 1/08* (2006.01)
*H04L 5/00* (2006.01)
*H04L 27/26* (2006.01)

(52) U.S. Cl.
CPC .............. *H04W 72/02* (2013.01); *H04L 1/001* (2013.01); *H04L 1/0003* (2013.01); *H04L 1/0013* (2013.01); *H04L 1/08* (2013.01); *H04L 5/0044* (2013.01); *H04L 27/2613* (2013.01)

(58) Field of Classification Search
CPC ...................................................... H04W 72/02
USPC ......................................................... 370/328
See application file for complete search history.

(56) References Cited

U.S. PATENT DOCUMENTS 7,099,409 B2 8/2006 Yousef
7,433,418 B1 10/2008 Dogan et al.
7,937,101 B2 5/2011 Corke et al.

(Continued)

FOREIGN PATENT DOCUMENTS

CN 101039290 A 9/2007
EP 1533963 A2 5/2005

(Continued)

OTHER PUBLICATIONS

International Search Report and Written Opinion—PCT/US2012/033834—ISA/EPO—Jun. 21, 2012.

(Continued)

*Primary Examiner* — Guang Li
(74) *Attorney, Agent, or Firm* — Eric Ho

(57) ABSTRACT

Systems, methods, and devices to enable range extension for wireless communication in sub-gigahertz bands are described herein. In some aspects, portions of packets are repeated in time and/or space when transmitting the packet in order to increase the chance that the packet can be decoded. The repetition of portions of the packet may be based, in part, on the channel characteristics of the channel over which the packet is sent. In some aspects, portions of packets are transmitted over a smaller bandwidth with increased power per frequency range.

88 Claims, 9 Drawing Sheets

(56) References Cited

U.S. PATENT DOCUMENTS

| | | |
|---|---|---|
| 8,149,930 B2* | 4/2012 | Nakao ............................ 375/260 |
| 8,165,008 B2 | 4/2012 | Ridel et al. |
| 8,351,463 B2* | 1/2013 | Tanaka et al. ................. 370/473 |
| 8,553,730 B2* | 10/2013 | Schmidl et al. ............... 370/512 |
| 8,644,128 B2* | 2/2014 | Zhang et al. .................. 370/203 |
| 2004/0111217 A1 | 6/2004 | Bednar |
| 2006/0135067 A1 | 6/2006 | Dunko |
| 2007/0064822 A1* | 3/2007 | Nakao ............................ 375/260 |
| 2007/0254596 A1 | 11/2007 | Corson et al. |
| 2007/0268986 A1 | 11/2007 | Morita |
| 2008/0130485 A1 | 6/2008 | Yang |
| 2008/0151822 A1 | 6/2008 | Hansen et al. |
| 2008/0260084 A1 | 10/2008 | Horiguchi |
| 2008/0310336 A1 | 12/2008 | Gaikwad |
| 2009/0122882 A1* | 5/2009 | Mujtaba ........................ 375/260 |
| 2009/0225727 A1 | 9/2009 | Chen |
| 2009/0285241 A1* | 11/2009 | Zhang et al. .................. 370/476 |
| 2009/0285339 A1* | 11/2009 | Zhang et al. .................. 375/343 |
| 2010/0040044 A1 | 2/2010 | Izumi et al. |
| 2010/0260138 A1 | 10/2010 | Liu et al. |
| 2010/0260159 A1* | 10/2010 | Zhang et al. .................. 370/338 |
| 2011/0051747 A1* | 3/2011 | Schmidl et al. ............... 370/474 |
| 2011/0116565 A1 | 5/2011 | Mujtaba |
| 2011/0182241 A1 | 7/2011 | Hansen et al. |
| 2011/0194545 A1 | 8/2011 | Yang et al. |
| 2011/0222519 A1* | 9/2011 | Liao et al. ..................... 370/338 |
| 2012/0201315 A1* | 8/2012 | Zhang et al. .................. 375/260 |
| 2012/0263141 A1 | 10/2012 | Taghavi Nasrabadi et al. |
| 2012/0327871 A1* | 12/2012 | Ghosh et al. .................. 370/329 |
| 2013/0114757 A1* | 5/2013 | Park et al. ..................... 375/295 |
| 2014/0177743 A1* | 6/2014 | Zhang et al. .................. 375/260 |

FOREIGN PATENT DOCUMENTS

| | | |
|---|---|---|
| JP | 2007208522 A | 8/2007 |
| JP | 2007306474 A | 11/2007 |
| JP | 2013509795 A | 3/2013 |
| WO | 2004091113 A1 | 10/2004 |
| WO | 2006110102 A1 | 10/2006 |

OTHER PUBLICATIONS

Morikura M., et al., "Impress Standard Textbook Series, 3rd Revision, 802.11 High-Speed Wireless LAN Textbook", ed., first edition, Apr. 11, 2008, Impress R& D, Inc., pp. 172 to 176, ISBN:978-4-8443-2546-8.

* cited by examiner

SYSTEMS AND METHODS FOR RANGE EXTENSION OF WIRELESS COMMUNICATION IN SUB GIGAHERTZ BANDS

CROSS-REFERENCE TO RELATED APPLICATIONS

This application claims priority under 35 U.S.C. §119(e) to U.S. Provisional App. No. 61/475,814, filed Apr. 15, 2011, which is incorporated by reference herein in its entirety.

BACKGROUND

1. Field

The present application relates generally to wireless communications, and more specifically to systems, methods, and devices to enable wireless communication in sub-gigahertz bands. Certain aspects herein relate to extending the range of operability of wireless communication in sub-gigahertz bands.

2. Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may transmit/receive data packets between each other. These data packets include overhead information (e.g., header information, packets properties, etc.) that helps in routing the packet through the network, identifying the data in the packet, processing the packet, etc., as well as data, for example user data, multimedia content, etc. as might be carried in a payload of the packet.

A bandwidth or other transmission parameters that are used to form a transmission signal or otherwise send a packet may be selected based on any number of factors. In some systems, it is advantageous to use wireless signals that are in a sub-gigahertz band. Thus, systems, methods, and devices for wirelessly communicating in a sub-gigahertz band are desired.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include extending the range of operability of wireless communication in sub-gigahertz bands.

One aspect of the disclosure provides a method for wireless communication. The method comprises determining information identifying a characteristic of a communication channel. The method further comprises modifying a number of times to repeat a training sequence based on the determined information. The method further comprises transmitting a physical packet comprising the training sequence repeated the modified number of times and a data portion.

Another aspect of the disclosure provides a method for wireless communication. The method comprises identifying a number of frequency ranges in a time segment to use for transmission of a physical packet. The method further comprises selecting a subset of the number of frequency ranges. The method further comprises setting a transmit power for each of the subset of the number of frequency ranges based on the number of frequency ranges. The method further comprises transmitting the physical packet using the subset of the number of frequency ranges.

Another aspect of the disclosure provides a method for wireless communication. The method comprises receiving a physical packet comprising a plurality of sets of repeated training sequences and a data portion, each of the sets of repeated training sequences comprising a plurality of repeated training sequences. The method further comprises determining the number of times the sets of training sequences are repeated.

Another aspect of the disclosure provides an apparatus for wireless communication. The apparatus comprises a processor configured to determine information identifying a characteristic of a communication channel. The processor is further configured to modify a number of times to repeat a training sequence based on the determined information. The apparatus further comprises a transmitter configured to transmit a physical packet comprising the training sequence repeated the modified number of times and a data portion.

Another aspect of the disclosure provides an apparatus for wireless communication. The apparatus comprises a processor configured to identify a number of frequency ranges in a time segment to use for transmission of a physical packet. The processor is further configured to select a subset of the number of frequency ranges. The processor is further configured to set a transmit power for each of the subset of the number of frequency ranges based on the number of frequency ranges. The apparatus further comprises a transmitter configured to transmit the physical packet using the subset of the number of frequency ranges.

Another aspect of the disclosure provides an apparatus for wireless communication. The apparatus comprises a receiver configured to receive a physical packet comprising a plurality of sets of repeated training sequences and a data portion, each of the sets of repeated training sequences comprising a plurality of repeated training sequences. The apparatus further comprises a processor configured to determine the number of times the sets of training sequences are repeated.

Another aspect of the disclosure provides an apparatus for wireless communication. The apparatus comprises means for determining information identifying a characteristic of a communication channel. The apparatus further comprises means for modifying a number of times to repeat a training sequence based on the determined information. The apparatus further comprises means for transmitting a physical packet comprising the training sequence repeated the modified number of times and a data portion.

Another aspect of the disclosure provides an apparatus for wireless communication. The apparatus comprises means for identifying a number of frequency ranges in a time segment to use for transmission of a physical packet. The apparatus further comprises means for selecting a subset of the number of frequency ranges. The apparatus further comprises means for setting a transmit power for each of the subset of the number of frequency ranges based on the number of frequency ranges. The apparatus further comprises means for transmitting the physical packet using the subset of the number of frequency ranges.

Another aspect of the disclosure provides an apparatus for wireless communication. The apparatus comprises means for receiving a physical packet comprising a plurality of sets of repeated training sequences and a data portion, each of the sets of repeated training sequences comprising a plurality of repeated training sequences. The apparatus further comprises means for determining the number of times the sets of training sequences are repeated.

Another aspect of the disclosure provides a computer readable medium comprising instructions that when executed cause an apparatus to perform a method of wireless communication, the method comprising determining information identifying a characteristic of a communication channel. The method further comprises modifying a number of times to repeat a training sequence based on the determined information. The method further comprises transmitting a physical packet comprising the training sequence repeated the modified number of times and a data portion.

Another aspect of the disclosure provides a computer readable medium comprising instructions that when executed cause an apparatus to perform a method of wireless communication, the method comprising identifying a number of frequency ranges in a time segment to use for transmission of a physical packet. The method further comprises selecting a subset of the number of frequency ranges. The method further comprises setting a transmit power for each of the subset of the number of frequency ranges based on the number of frequency ranges. The method further comprises transmitting the physical packet using the subset of the number of frequency ranges.

Another aspect of the disclosure provides a computer readable medium comprising instructions that when executed cause an apparatus to perform a method of wireless communication, the method comprising receiving a physical packet comprising a plurality of sets of repeated training sequences and a data portion, each of the sets of repeated training sequences comprising a plurality of repeated training sequences. The method further comprises determining the number of times the sets of training sequences are repeated.

DETAILED DESCRIPTION

Figure 1:
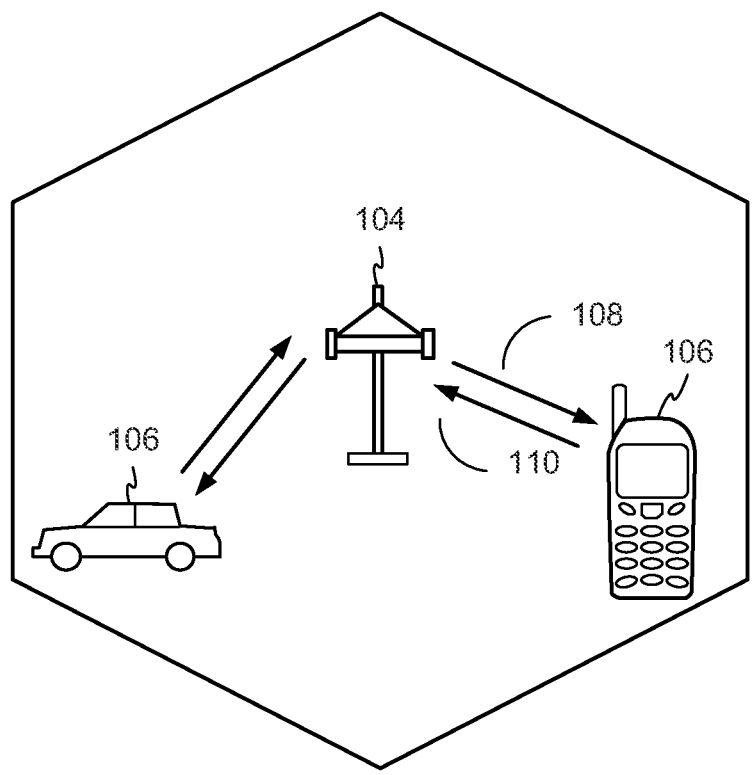
FIG. 1 illustrates an example of a wireless communication system in which aspects of the present disclosure may be employed.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the IEEE 802.11 family of wireless protocols. For example, the various aspects described herein may be used as part of the IEEE 802.11ah protocol, which uses sub-1 GHz bands.

In some aspects, wireless signals in a sub-gigahertz band may be transmitted according to the 802.11ah protocol using orthogonal frequency-division multiplexing (OFDM). Implementations of the 802.11ah protocol may be used for sensors, metering, and smart grid networks. Advantageously, aspects of certain devices implementing the 802.11ah protocol may experience increased battery life with respect to other wireless protocols, and may be used to transmit wireless signals across a relatively long range, for example about one kilometer or longer.

In some implementations, a WLAN includes various devices which are the components that access the wireless network. For example, there may be two types of devices: access points ("APs") and clients (also referred to as stations, or "STAB"). In general, an AP serves as a hub or base station for the WLAN and an STA serves as a user of the WLAN. For example, an STA may be a laptop computer, a personal digital assistant (PDA), a mobile phone, etc. In an example, an STA connects to an AP via a WiFi (e.g., IEEE 802.11 protocol such as 802.11ah) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 illustrates an example of a wireless communication system 100 in which aspects of the present disclosure may be employed. The wireless communication system 100 may be a wireless communication system, for example an 802.11ah system. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from an AP 104 to an STA 106 may be referred to as a downlink (DL) 108, and a communication link that facilitates transmission from an STA 106 to an AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between STAs 106. Accordingly, the functions of the AP 104 described herein may alternatively be performed by one or more STAs 106.

Figure 2:
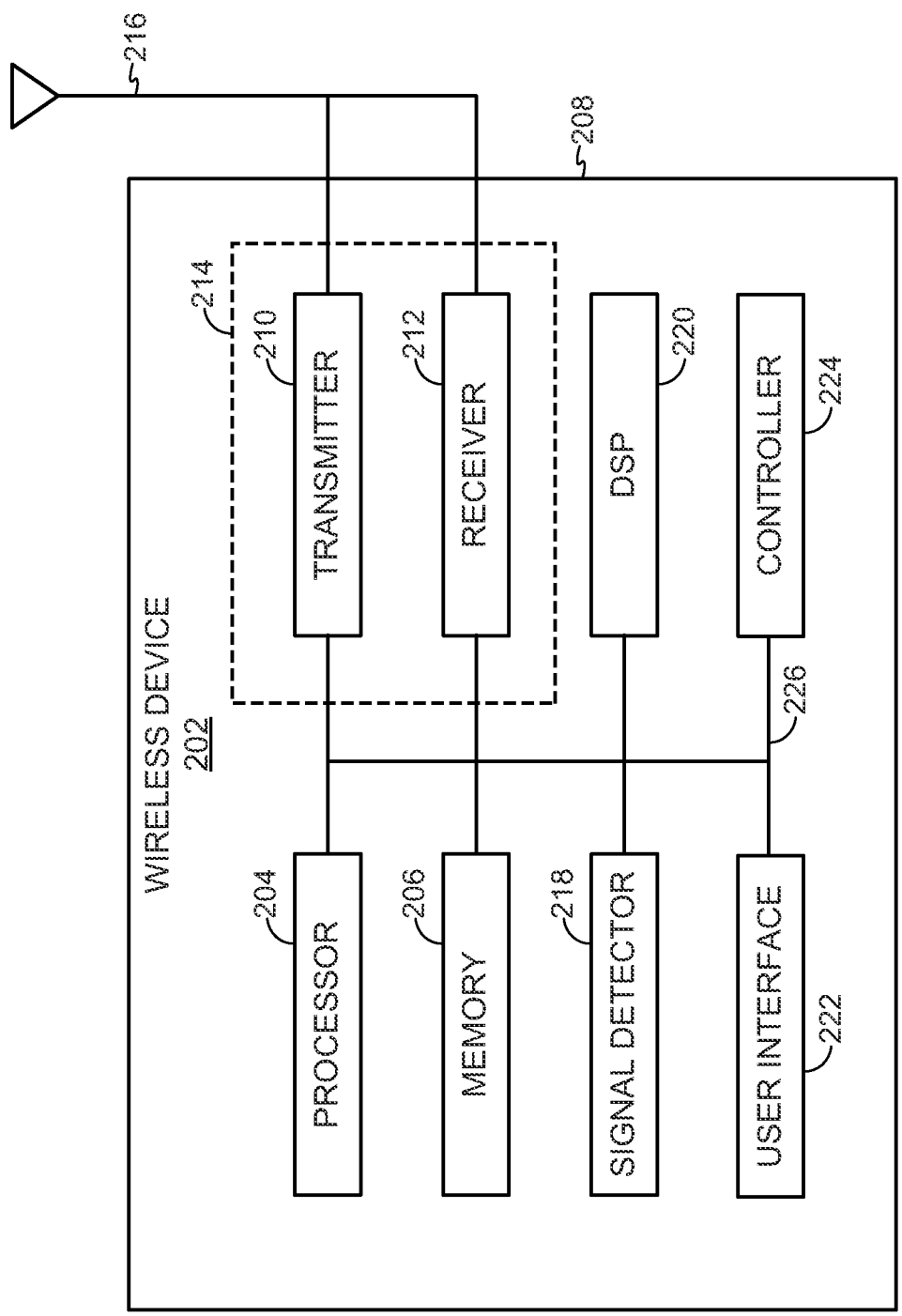
FIG. 2 illustrates various components that may be utilized in a wireless device that may be employed within the wireless communication system of FIG. 1.

FIG. 2 illustrates various components that may be utilized in a wireless device 202 that may be employed within the wireless communication system 100. The wireless device 202 is an example of a device that may be configured to implement the various methods described herein. The wireless device 202 may comprise an AP 104 or an STA 106, for example.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals.

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The wireless device 202 may further comprise a controller 224 in some aspects. The controller 224 may control certain operations of the wireless device 202. For example, the controller 224 may control or adjust operation of the processor 204, transmitter 210, receiver 212, signal detector 218, and/or DSP 220. In some aspects, the controller 224 is configured to adjust the format of packets of data sent and received by the wireless device 202, as described in additional detail below.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the DSP 220. Further, each of the components illustrated in FIG. 2 may be implemented using a plurality of separate elements.

Figure 3:
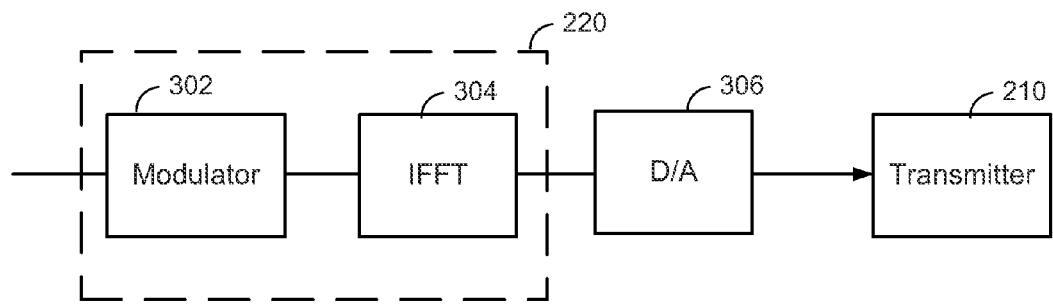
FIG. 3 illustrates various components that may be utilized in the wireless device of FIG. 2 to transmit wireless communications.

As discussed above, the wireless device 202 may comprise an AP 104 or an STA 106, and may be used to transmit and/or receive communications. FIG. 3 illustrates various components that may be utilized in the wireless device 202 to transmit wireless communications. The components illustrated in FIG. 3 may be used, for example, to transmit OFDM communications.

The wireless device 202 may comprise a modulator 302 configured to modulate bits for transmission. For example, the modulator 302 may determine a plurality of symbols from bits received from the processor 204 or the user interface 222, for example by mapping bits to a plurality of symbols according to a constellation. In some aspects, the bits are received in codewords. In one aspect, the modulator 302 comprises a QAM (quadrature amplitude modulation) modulator that may operate in a plurality of different modes, for example a 16-QAM mode, a 64-QAM mode, a binary phase-shift keying (BPSK) mode, a quadrature phase-shift keying (QPSK) mode, etc.

The wireless device 202 may further comprise a transform module 304 configured to convert symbols or otherwise modulated bits from the modulator 302 into a time domain. In FIG. 3, the transform module 304 is illustrated as being implemented by an inverse fast Fourier transform (IFFT) module. The IFFT may be configured with a plurality of modes, and may use a different number of points to convert the symbols in each mode. For example, the IFFT may have a mode where 64 points are used to convert symbols being transmitted over 64 tones into a time domain, and a mode where 128 points are used to convert symbols being transmitted over 128 tones into a time domain. The number of points used by the transform module 304 may be referred to as the size of the transform module 304.

In FIG. 3, the modulator 302 and the transform module 304 are illustrated as being implemented in the DSP 220. In some aspects, however, one or both of the modulator 302 and the transform module 304 are implemented in the processor 204 or in another element of the wireless device 202.

The wireless device 202 may further comprise a digital to analog converter 306 configured to convert the output of the transform module into an analog signal. For example, the time-domain output of the transform module 304 may be converted to a baseband OFDM signal by the digital to analog converter 306. The digital to analog converter 306 may be implemented in the processor 204 or in another element of the wireless device 202. In some aspects, the digital to analog converter 306 is implemented in the transceiver 214 or in a data transmit processor.

The analog signal may be wirelessly transmitted by the transmitter 210. The analog signal may be further processed before being transmitted by the transmitter 210, for example by being filtered or by being upconverted to an intermediate or carrier frequency. In some aspects, the transmitter 210 is configured to transmit one or more packets in a wireless signal based on the analog signal. The packets may be generated using the processor 204 and/or the DSP 220, for example using the modulator 302 and the transform module 304. Details about the above techniques and about the packets that may be received and processed as described above are described in additional detail below.

Figure 4:
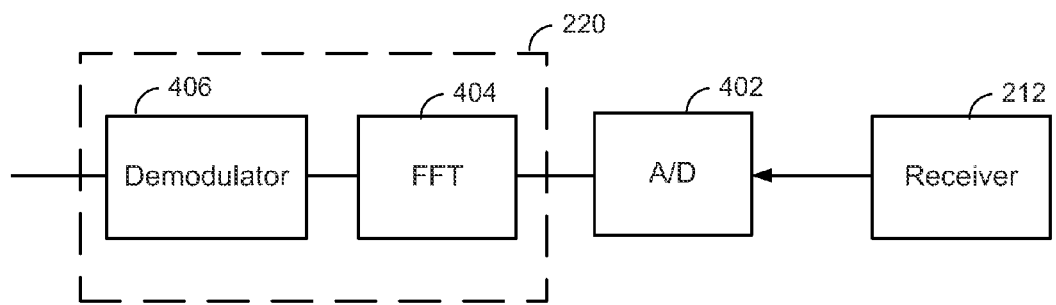
FIG. 4 illustrates various components that may be utilized in the wireless device of FIG. 2 to receive wireless communications.

FIG. 4 illustrates various components that may be utilized in the wireless device 202 to receive wireless communications. The components illustrated in FIG. 4 may be used, for example, to receive OFDM communications.

The wireless device 202 may comprise an analog to digital converter 402 configured to convert a wireless signal received by the receiver 212 into a digital representation thereof. The wireless signal may be processed before being converted by the digital to analog converter 402, for example by being filtered or by being downconverted to an intermediate or baseband frequency. The analog to digital converter 402 may be implemented in the processor 204 or in another element of the wireless device 202. In some aspects, the analog to digital converter 402 is implemented in the transceiver 214 or in a data receive processor.

The wireless device 202 may further comprise a transform module 404 configured to convert the representation the wireless signal into a frequency spectrum. In FIG. 4, the transform module 404 is illustrated as being implemented by a fast Fourier transform (FFT) module. The FFT may be configured with a plurality of modes, and may use a different number of points to convert the signal in each mode. For example, the FFT may have a mode where 64 points are used to convert a signal received over 64 tones into a frequency spectrum, and a mode where 128 points are used to convert a signal received over 128 tones into a frequency spectrum. The number of points used by the transform module 404 may be referred to as the size of the transform module 304. In some aspects, the transform module may identify a symbol for each of the points that it uses.

The wireless device 202 may further comprise a demodulator 406 configured to demodulate the data in the frequency spectrum. For example, the demodulator 406 may determine a plurality of bits from symbols output by the transform module 404, for example by reversing a mapping of bits to a symbol in a constellation. The bits may be processed or evaluated by the processor 204, or used to display or otherwise output information to the user interface 222. In some aspects, the bits correspond to codewords. In one aspect, the demodulator 406 comprises a QAM (quadrature amplitude modulation) demodulator that may operate in a plurality of different modes, for example a 16-QAM mode, a 64-QAM mode, a binary phase-shift keying (BPSK) mode, a quadrature phase-shift keying (QPSK) mode, etc.

In FIG. 4, the transform module 404 and demodulator 406 are illustrated as being implemented in the DSP 220. In some aspects, however, one or both of the transform module 404 and the demodulator 406 are implemented in the processor 204 or in another element of the wireless device 202.

In some aspects, the wireless signal received at the receiver 212 comprises one or more packets. The packets may be evaluated or otherwise processed using the processor 204 and/or the DSP 220, for example using the transform module 404 and the demodulator 406. In some aspects, a duration of each of the packets or other properties of the packets may be determined during such processing or evaluation. Details about the above techniques and about the packets that may be received and processed as described above are described in additional detail below.

In some aspects, the wireless device 202 is configured to transmit and receive data over long ranges (~1 km) with other wireless devices (e.g., other wireless devices 202). Data packets received over such long distances are subject to substantial interference due to attenuation of the signal as distance increases. Accordingly, the signal to noise ratio (SNR) at the receiver may be dramatically decreased. One way to boost the SNR at the receiver would be to increase the total power by which a data packet is transmitted, thus increasing the signal strength at the receiver. However, wireless device 202 may have a limited power supply (e.g., a battery) and therefore such a method of boosting SNR may not be feasible. Therefore, in order to extend the range over which data packets are sent without substantially affecting the transmit power for transmitting the data packets, the data packets themselves may be modified in order to increase the ability of the receiver to correctly receive the data in the data packet despite having a low SNR.

In one aspect, one or more portions of the data packet may be repeated, such as in time and/or spatially (e.g., across several frequencies). The receiver can gather the repeated copies of the portions of the data packet and combine them in a constructive manner in order to increase the signal level of each of the portions of the data packet, thus essentially boosting the received SNR of the data packet. For example, repeating a portion of the data packet K times may potentially increase the SNR of the portion of the data packet by a factor of K.

In another aspect, one or more portions of the data packet may be transmitted over less than the entire available frequency range (e.g., a fraction of the tones available for transmission) for transmitting data using the same total transmit power as would be used to transmit the data packet for the entire available frequency range. Accordingly, each portion of the data packet is transmitted with a higher power (a larger proportion of the total transmit power) over a smaller frequency range, thus increasing the signal strength of the received portions of the packet on the smaller frequency range. Accordingly, the SNR of the received portions of the data packet over the smaller frequency range is increased.

In yet another aspect, the above techniques may be combined, such as repeating some portions of the data packet and transmitting some portions over a smaller frequency range.

Details about the above techniques and about the packets that may be received and processed as described above are described in additional detail below.

Figure 5:
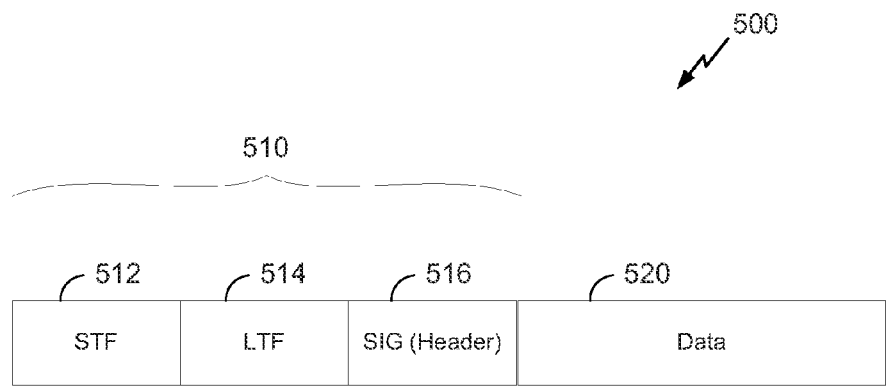
FIG. 5 illustrates an example of a packet.

FIG. 5 illustrates an example of a packet 500. The packet 500 may comprise a physical (PHY) layer packet or frame for use with the wireless device 202. For example, the packet 500 may be used for standard communications between the wireless device 202 and other wireless devices.

In the illustrated aspect, the packet 500 comprises a preamble 510 and a payload 520. The preamble 510 may include a training field and signal (SIG) field 516. In the aspect illustrated in FIG. 5, the training field comprises a short training field (STF) 512 followed by a long training field (LTF) 514. The STF 512 may be used to detect the start of the packet 500, and the LTF 514 may be used for channel estimation, for example. In some aspects an STF includes a plurality of repeated training sequences. In some aspects an LTF includes a plurality of repeated training sequences.

The preamble 510 further comprises a SIG field 516. The SIG field 516 may indicate a duration of the packet 500, as well as other parameters such as bandwidth of a remaining portion of the packet 500. In some aspects, the SIG field 516 comprises a space-time block coding (STBC) sub-field, a modulation and coding scheme (MCS) sub-field, and/or a cyclic redundancy check (CRC) sub-field. The SIG field 516 may contain characteristics of the data in the payload 520.

Figure 6:
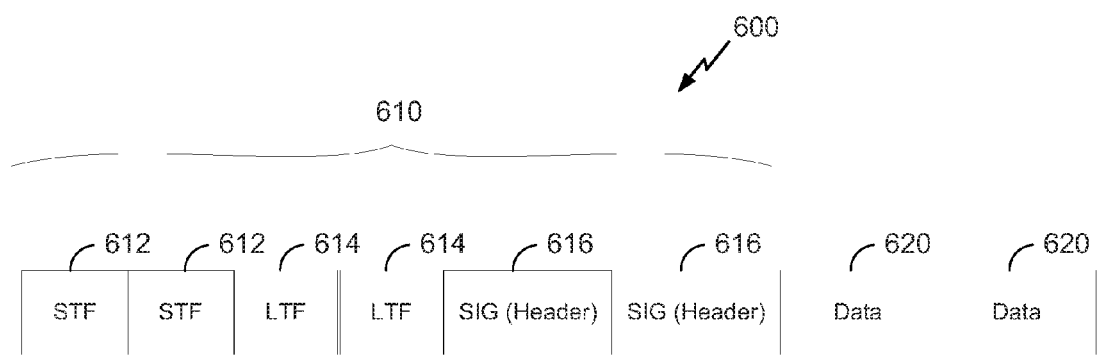
FIG. 6 illustrates an example of a packet.

FIG. 6 illustrates an example of a packet 600. The packet 600 may comprise a physical (PHY) layer packet or frame for use with the wireless device 202, wherein certain fields of the packet 600 are repeated in order to be used in long range communications. Similar to the packet 500, the packet 600 may include a preamble 610 and a payload 620. The preamble 610 may include a training field and signal (SIG) field 616. Further, like the packet 500, the training field may include a short training field (STF) 612 followed by a long training field (LTF) 614.

In order to aid in long range communications as described above, certain portions of the packet 600 may be repeated any number of times. As shown, each of the STF field 612, LTF field 614, SIG field 616, and payload 620 are repeated 2 times. It should be noted that each of the fields do not need to be repeated and any combination of fields may be repeated without repeating the other fields, for example, only the STF field 612 and the LTF field 614 may be repeated. Further, it should be noted that each of the fields that is repeated do not need to be repeated the same number of times as another field. For example, the STF field 612 may be repeated 4 times, while the SIG field 616 is repeated only 2 times. Further, only portions of a given field may be repeated, for example, only a subset of the SIG field 616 may be repeated such as if only a subset of the data is relevant. In addition, the number of times any of the fields or portions of fields are repeated may vary from packet to packet.

The repetition of the fields in the packet 600 may be performed at any one of several stages in the processing of data to be sent by the wireless device 202. For example, as discussed above with respect to FIG. 3, bits to be transmitted by the wireless device 202 are modulated by a modulator 302 to form symbols or otherwise modulated bits. The symbols or otherwise modulated bits are then transformed, such as by transform module 304, to a time domain, such as into an OFDM symbol. Accordingly, in one aspect, repetition of the fields can be performed at the bit level, meaning that the bits that make up a given field may be repeated before going through the modulator 302. In another aspect, the bits that make up a given field may first by modulated by the modulator 302 to form symbols, and the symbols themselves may be repeated. In yet another aspect, the bits that make up a given field may be modulated to form symbols, the symbols may be transformed to the time domain, and the transformed output may then be repeated. In a similar aspect, the transformed output, such as an OFDM symbol may be repeated, but instead of repeating exact copies, each copy may be a rotated OFDM symbol, or the order of the tones in the signal may be changed for each copy. Accordingly, one will recognize that repetition of the fields in the packet 600 may occur at any appropriate stage in the processing of a packet.

In one aspect, the STF field 612 and/or the LTF field 614 are repeated. In one aspect, when repeating either or both of the STF field 612 and the LTF field 614, the same data is copied multiple times in the packet 600. Accordingly, there may be multiple STF fields 612 and/or LTF fields 614 each with the same data as their respective field type copies. In another aspect, different sequences are used in each copy of the either or both of the STF field 612 and the LTF field 614. When these copies using different sequences are combined, they can form a long sequence that has increased processing gain, which essentially boosts the SNR. For example, if the STF field 612 is repeated K times with different sequences, the resulting long sequence may have K times the processing gain, and accordingly K times the SNR, as a single STF field 612.

In one aspect, the SIG field 616 may be repeated, in its entirety or only a portion of the SIG field 616, in order to boost SNR of the received signal. In another aspect, the SIG field 616 could be redesigned using a more reliable modulation, spreading, coding, and/or repetition scheme in order to boost the SNR. In another aspect, the payload 620 may be repeated to boost SNR. In yet another aspect, the coding rate of the payload 620 may be decreased in order to boost the SNR.

As discussed above, the portions of the packet 600 may be repeated in the time-domain and/or the frequency domain. The repetition in each of the domains is described below with respect to FIGS. 7 and 8.

Figure 7:
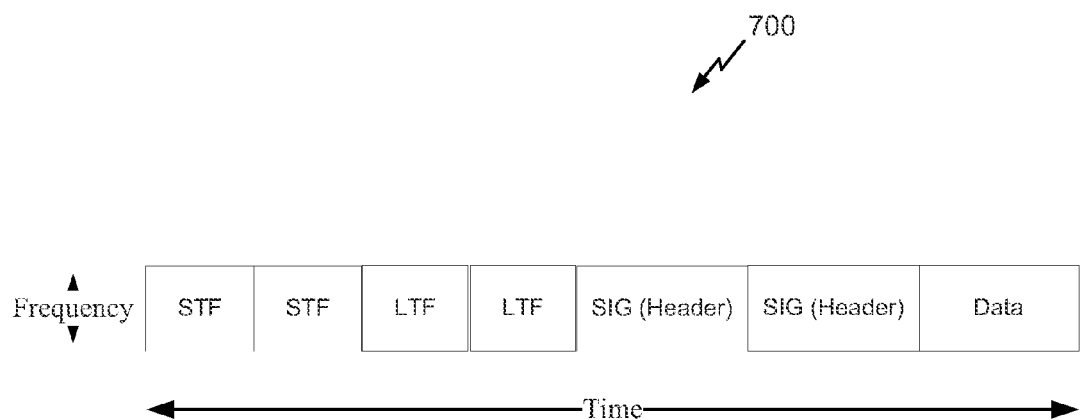
FIG. 7 illustrates repetition of fields of a packet in the time-domain.

FIG. 7 illustrates repetition of fields of a packet 700 in the time-domain. Repetition in the time-domain requires transmitting the fields over the same frequency range or ranges at different times. The packet 700 may be similar to the packet 600. As shown, portions of the packet 700 are repeated over time, while occupying the same frequency range. In one aspect, repetition in the time-domain may be used for any field type of the packet 700.

Figure 8:
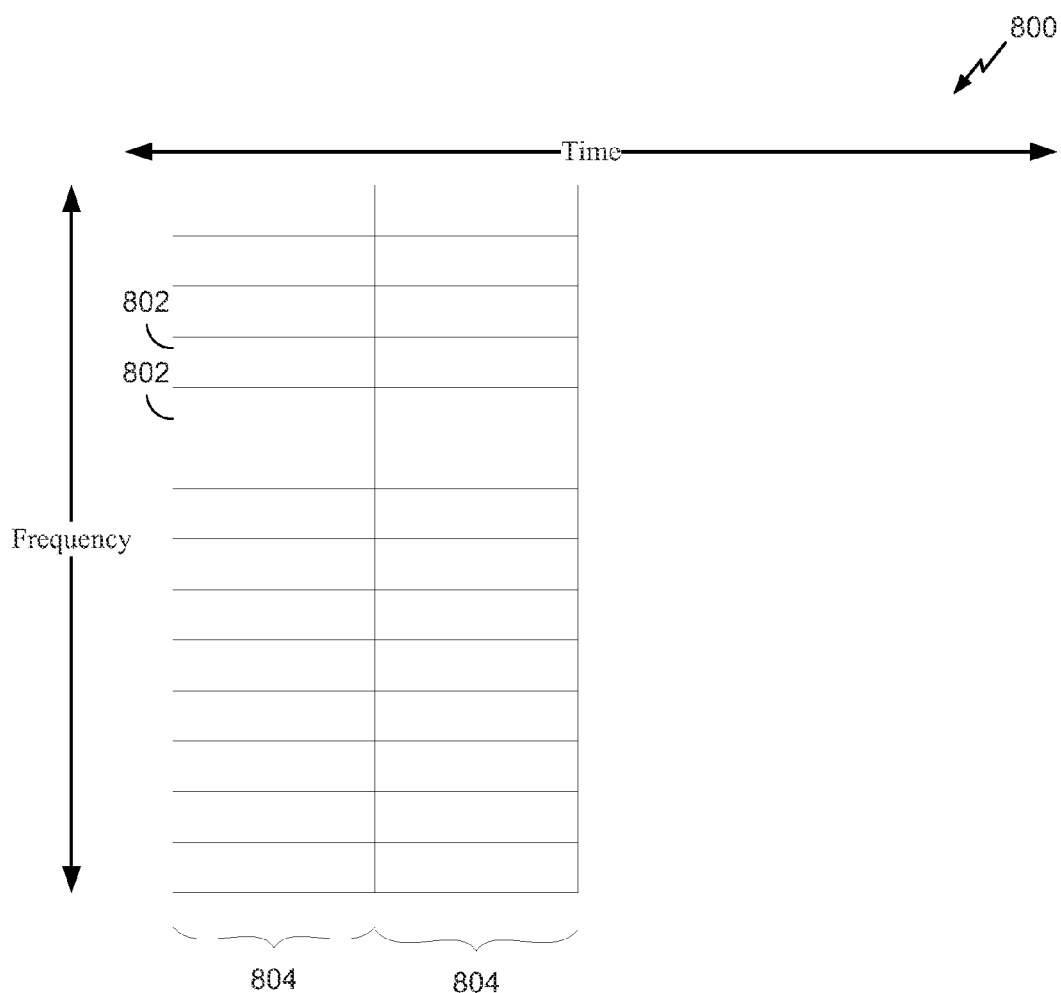
FIG. 8 illustrates repetition of fields of a packet in the frequency-domain.

FIG. 8 illustrates repetition of fields of a packet in the frequency-domain. As shown, data packets may be transmitted over both time and different frequencies. In the time domain, transmission of data is separated into set time segments 804, which may be referred to as OFDM symbols. In a given time segment 804, transmission of data is separated into blocks of frequency ranges 802, which may be referred to as tones. Therefore, a time segment 804 may comprise a plurality of frequency ranges 802. In one aspect, repetition of portions of a packet in the frequency domain is performed as follows. The available frequency ranges 802 in a given time segment 804 are divided into K groups, K being representative of the number of times a portion of the packet is to be repeated. The groups of frequency ranges 802 may be contiguous, or the groups may be interleaved with each other. Further, a copy of the portion of the packet to be repeated is then placed in each of the K groups. The receiver may then receive the K copies of the repeated portion or portions of the packet and combine them constructively to boost the SNR. In some aspects, since multiple frequency ranges 802 are used to transmit the same data, only a portion equal to approximately 1/K of the amount of unique data to be sent in the packet is transmitted in a given time segment 804. Without repetition, an entire packet may be sent in a single time segment 804. Accordingly, it may take K time segments 804 to transmit the entire packet of data. In one aspect, repetition in the frequency-domain may be used for any field type of a packet. In another aspect, repetition in the frequency-domain may be limited to the SIG fields and/or payload.

As discussed above, portions of a packet may be repeated in the time-domain and/or frequency-domain to boost the SNR of a received signal. Increasing the repetition of portions of a packet, while keeping transmission power constant, can increase the SNR of the received signal. Other techniques used to boost SNR include using different modulation techniques for modulating the packet to be sent. In one aspect, one parameter of such modulation that may be adjusted is a rate of modulation for a packet. For example, in QAM modulation, different rates may be used, such as 64-QAM, 32-QAM, QPSK, and BPSK. A 64-QAM modulation scheme has a higher rate than a 32-QAM modulation scheme, meaning more bits are transmitted per symbol. If symbols of different rates are transmitted at the same power level, the higher the modulation rate, the lower the SNR is with respect to portions of the packet received as the power is divided among the bits sent in the symbol. Therefore, reducing the modulation rate while keeping the transmission power constant can increase the SNR of the received signal.

In one aspect, a wireless device 202 may modify the number of times a portion of a packet is repeated based on at least one characteristic (e.g., SNR, carrier to interference (C/I) ratio, signal to interference-plus-noise ratio (SINR), etc.) of a communication channel over which the wireless device 202 transmits the packet. For example, the wireless device 202 may determine information regarding a channel characteristic at another device receiving data from the wireless device 202. In one aspect, if the information about that channel characteristic indicates that the signal is unable to be properly decoded (e.g., SNR is too low) at the receiver, the transmitter may increase the number of times a portion of a packet is repeated and/or decrease the rate at which the portion of the packet is modulated. In another aspect, if the information about that channel characteristic indicates that the signal is able to be properly decoded (e.g., SNR is high enough) at the receiver, but also indicates the signal is stronger than necessary to decode, the transmitter may decrease the number of times a portion of a packet is repeated and/or increase the rate at which the portion of the packet is modulated so as to be able to transfer more data using the same amount of communications resources (e.g., time segments, frequency ranges, etc.). In one aspect, the wireless device 202 may adjust a rate of modulation of the data packet before adjusting a number of times the data is repeated in the packet. For example, the wireless device 202 may adjust the rate to a lowest supported rate (e.g., BPSK) as necessary, and if the signal is still unable to be properly decoded, only then the wireless device 202 may adjust the number of times data is repeated in the packet. Similarly, as signal quality improves, repetition of data may be reduced before the rate is increased.

In one aspect, the wireless device 202 may determine the information about the channel characteristics by receiving information about the channel characteristics from the device to which the data packet is being transmitted. Alternatively, the wireless device 202 may receive such information from another source, such as a network component with which the wireless device 202 and/or the device to which the data packet is being transmitted communicate.

Figure 9:
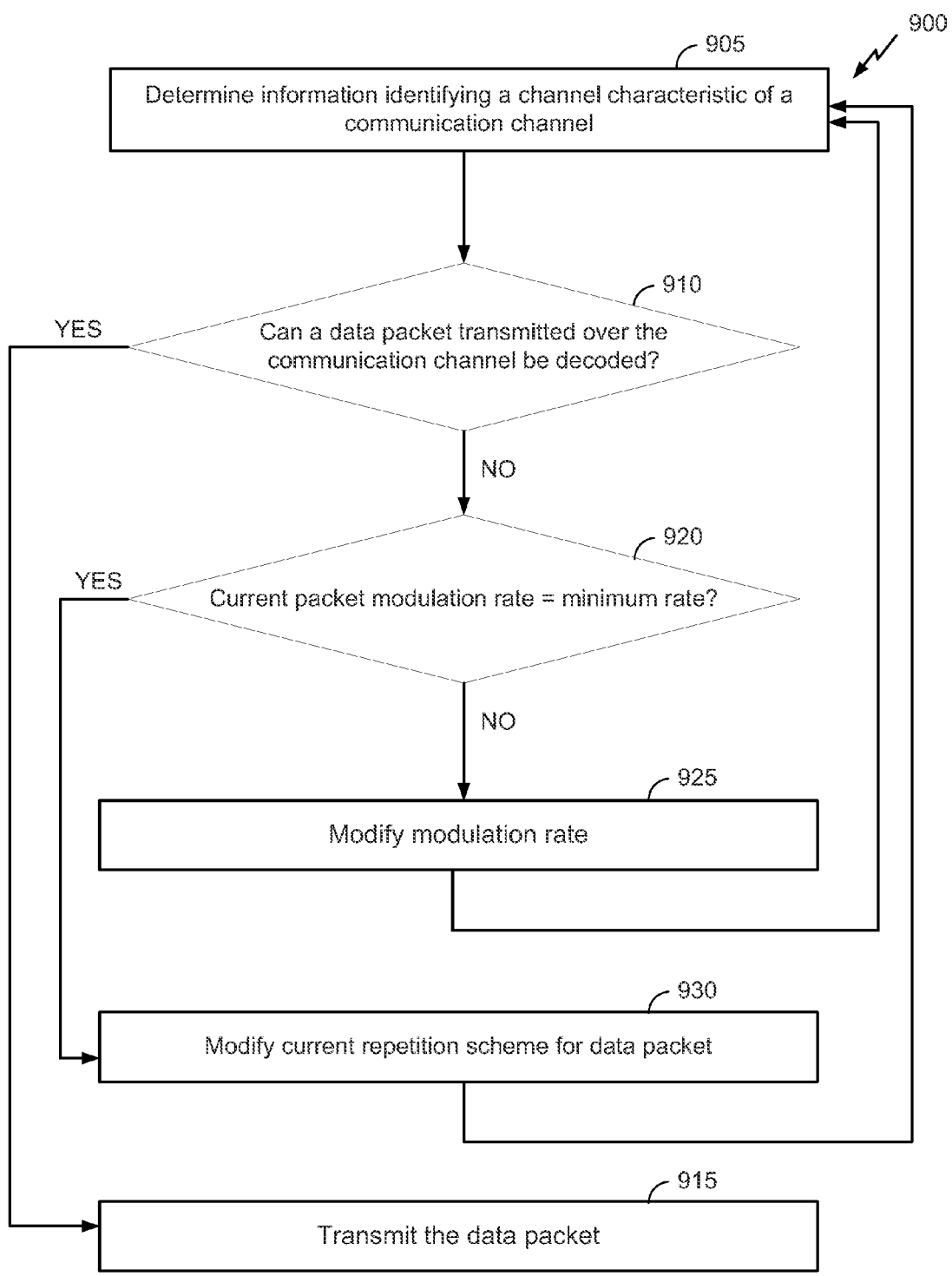
FIG. 9 illustrates an aspect of a method for determining how many times to repeat a given portion of a packet.

FIG. 9 illustrates an aspect of a method 900 for determining how many times to repeat a given portion of a packet. At 905, a wireless device 202 may determine information identifying a channel characteristic of a communication channel over which the wireless device 202 is to transmit a data packet. Further, at 910, the wireless device 202 may determine whether the determined information indicates that the data packet can be properly decoded by a receiving device (e.g., another wireless device 202) receiving the data packet if modulated at a current rate (e.g., initially 64-QAM) while repeating portions of the data packet a current number of times K (e.g., initially K=0). The receiving device may transmit such information to the wireless device 202. If the wireless device 202 determines the data packet can be properly decoded, the method 900 may continue to 915. At 915, the wireless device 202 transmits the data packet to the receiving device using the set rate and repetition scheme. If the wireless device 202 determines the data packet cannot be properly decoded, the method 900 may continue to 920.

At 920, the wireless device 202 determines whether the current rate is at a minimum rate (e.g., BPSK) for modulation of the packet. If at 920, the wireless device 202 determines the current rate is not the minimum rate, the wireless device 202 lowers the modulation rate for the data packet at 925. The method 900 then returns to 905.

If at 920, the wireless device 202 determines the current rate is the minimum rate, the method 900 continues to 930. At 930, the wireless device 202 increases the value of K which is the number of times at least a portion of the packet is repeated (e.g., in frequency and/or time). The method then returns to 905.

One of ordinary skill in the art should recognize that for the method 900, various blocks or steps may be added or omitted without departing from the spirit or scope of the invention. Further, the blocks or steps do not necessarily have to be in the same order as shown in FIG. 9 and described above. For example, the wireless device 202 may adjust the repetition scheme before adjusting the rate of sending data packet. In another example, the wireless device 202 may adjust the repetition scheme without adjusting the rate of sending packets.

In another aspect, as discussed above, the wireless device 202 may transmit one or more portions of the data packet over less than the entire available frequency range (e.g., a fraction of the tones available for transmission) for transmitting data using the same total transmit power as would be used to transmit the data packet for the entire available frequency range. For example, referring back to FIG. 8, in a given time segment 804, only a portion of the frequency ranges 802 may be used to transmit a packet. The amount of power used to transmit the time segment 804, however, may be the same as the power used to transmit across all the frequency ranges 802 in the time segment 804. Accordingly, if 1/K of the frequency ranges 802 of the time segment 804 are used, each frequency range 802 can be allocated K times as much power as compared to transmitting across all the frequency ranges 802. This would increase the signal strength for each received portion of the packet and boost SNR, potentially by K times. This may, however, also increase the number of time segments needed to transmit the entire packet (e.g., by K times) as less data is sent in each time segment 804.

In one aspect, the frequency ranges 802 not used in a time segment 804 may remain unused. In another aspect, the frequency ranges 802 not used in the time segment 804 may be allocated for use by other wireless devices, such as through OFDMA and a centralized resource allocation device (e.g., an access point).

Similar to as discussed above with respect to the repetition scheme, the frequency ranges 802 used for transmission of a packet in the time segment 804 may be adjusted based on at least one characteristic (e.g., SNR, carrier to interference (C/I) ratio, signal to interference-plus-noise ratio (SINR), etc.) of a communication channel over which the wireless device 202 transmits the packet. In one aspect, the wireless device 202 may adjust a rate of modulation of the data packet before adjusting the frequency ranges 802 used for transmission of a packet in the time segment 804. For example, the wireless device 202 may adjust the rate to a lowest supported rate (e.g., BPSK) as necessary, and if the signal is still unable to be properly decoded, only then the wireless device 202 may reduce the frequency ranges 802 used for transmission of a packet in the time segment 804. Similarly, as signal quality improves, the frequency ranges 802 used for transmission of a packet in the time segment 804 may be increased before the rate is increased.

Figure 10:
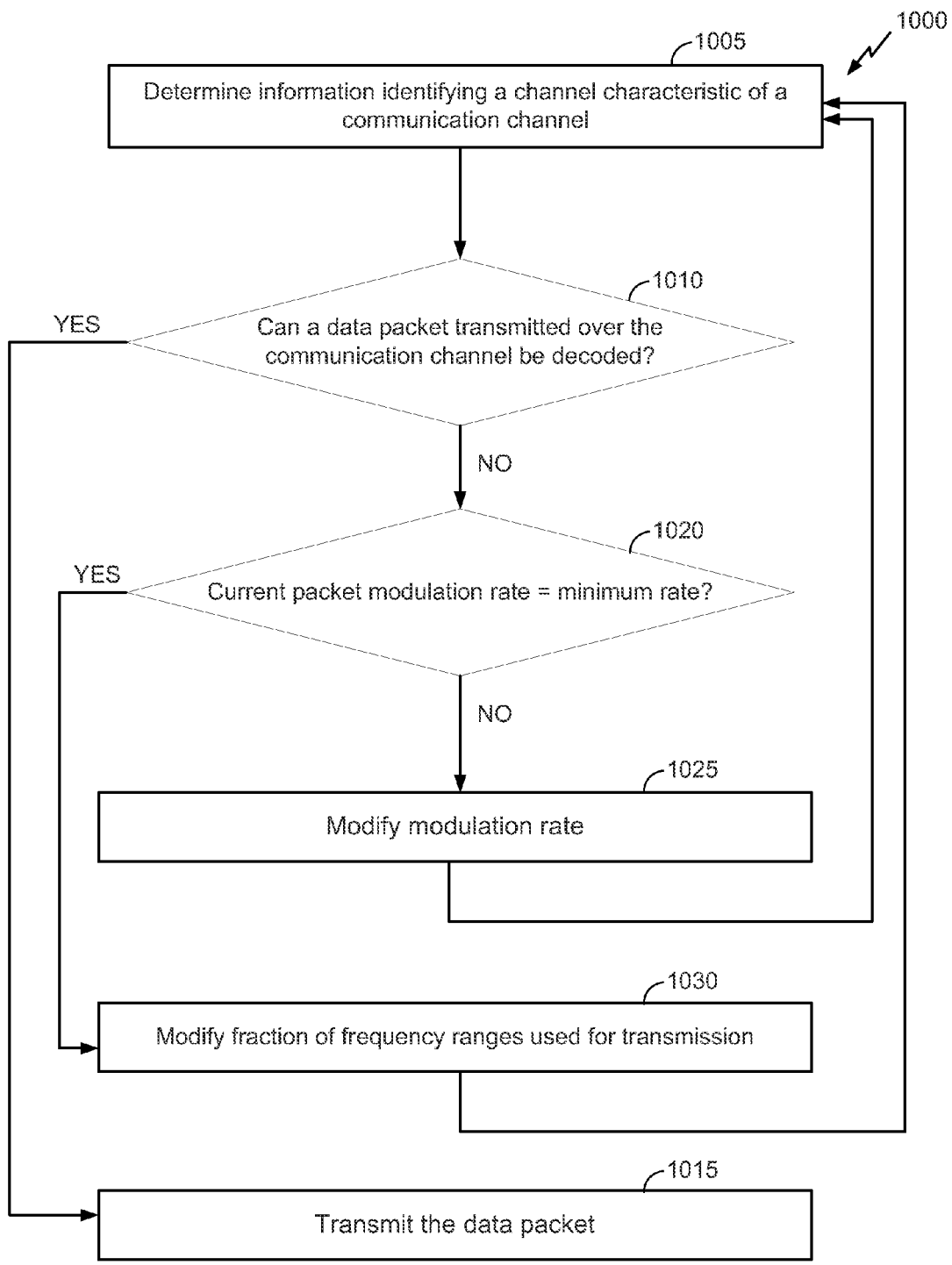
FIG. 10 illustrates an aspect of a method for determining what fraction of frequency ranges of a time segment to use for transmitting a data packet.

FIG. 10 illustrates an aspect of a method 1000 for determining what fraction of frequency ranges 802 of a time segment 804 to use for transmitting a data packet. At 1005, a wireless device 202 may determine information identifying a channel characteristic of a communication channel over which the wireless device 202 is to transmit a data packet. Further, at 1010, the wireless device 202 may determine whether the determined information indicates that the data packet can be properly decoded by a receiving device (e.g., another wireless device 202) receiving the data packet if modulated at a current rate (e.g., initially 64-QAM) while sending the packet over a current fraction (e.g., initially 1/K) of the frequency ranges 802 used for transmission of the packet in a time segment 804. The receiving device may transmit such information to the wireless device 202. If the wireless device 202 determines the data packet can be properly decoded, the method 1000 may continue to 1015. At 1015, the wireless device 202 transmits the data packet to the receiving device using the set rate and fraction of the frequency ranges 802. If the wireless device 202 determines the data packet cannot be properly decoded, the method 1000 may continue to 1020.

At 1020, the wireless device 202 determines whether the current rate is at a minimum rate (e.g., BPSK) for modulation of the packet. If at 1020, the wireless device 202 determines the current rate is not the minimum rate, the wireless device 202 lowers the modulation rate for the data packet at 1025. The method 1000 then returns to 1005.

If at 1020, the wireless device 202 determines the current rate is the minimum rate, the method 1000 continues to 1030. At 1030, the wireless device 202 increases the value of K, thereby decreasing the fraction 1/K of the frequency ranges 802 used for transmission of a packet in a time segment 804. The method then returns to 1005.

One of ordinary skill in the art should recognize that for the method 1000, various blocks or steps may be added or omitted without departing from the spirit or scope of the invention. Further, the blocks or steps do not necessarily have to be in the same order as shown in FIG. 10 and described above. For example, the wireless device 202 may adjust the fraction 1/K of the frequency ranges 802 used for transmission of a packet in a time segment 804 before adjusting the rate of sending data packet. In another example, the wireless device 202 may adjust the fraction 1/K of the frequency ranges 802 used for transmission of a packet in a time segment 804 without adjusting the rate of sending packets.

In one aspect, the wireless device 202 may operate in different modes, such as a normal mode and a low-rate mode. In the normal mode, the wireless device 202 may not repeat portions of packets when transmitting as discussed above. In the low-rate mode, the wireless device 202 may repeat portions of packets. The wireless device 202 may indicate in the packet the mode being used to transmit the packet, for example by modifying the preamble of the packet. In one aspect, a packet transmitted using the low-rate may have a preamble that is longer (e.g., 4 times longer) than a packet transmitted with a normal rate. A receiver of the packet may determine the mode, therefore, based on the preamble.

In one aspect, the amount of repetition (including, which portions are repeated and in what manner) and/or fraction of the frequency ranges 802 used for transmission is fixed between devices, such as at time of manufacture, time of initial communication, or updated periodically. In such situations, the transmitting device and receiving device may share information about the scheme for transmitting packets as necessary, such as being hard coded, or transmitting a packet that details the scheme to be used. In another aspect, the transmitter may change the scheme used "on the fly" without informing the receiving device. Accordingly, the receiving device needs to be able to detect the scheme used based on the packet sent.

Accordingly, in one aspect, the device (e.g., another wireless device 202) receiving a packet from a transmitting wireless device 202 may automatically detect whether repetition of the packet is used and/or if less than the entire bandwidth (i.e., less than all the frequency ranges 802) in a given time segment 804 is used to transmit the packet. In some aspects this is determined by processing at least a portion of the packet to check for repetition or partial bandwidth usage. In one aspect, the portion of the packet checked is the preamble (e.g., the STF field 612) as it is the first field to be received. For example, the transmitting device may be configured to select the number of times the STF field 612 is repeated and/or the fraction of the bandwidth used to transmit the STF field 612 based on the scheme used for repeating other portions of the packet (e.g., LTF field 614, SIG field 616, payload 620, etc.) and/or utilizing fractions of the bandwidth for other portions of the packet. The mapping of STF field 612 repetition and/or bandwidth usage to the repetition and/or bandwidth usage for other portions of the packet may be shared between the transmitter and receiver, such as at time of manufacture. The mapping may further be updateable at each device.

In one aspect, the device receiving a packet determines whether repetition of the packet is used by computing correlations in a received packet. For example, the receiving device can correlate, beginning at the start of the packet, a first portion of the packet in time and/or space corresponding to the amount of time and/or space needed for a first STF field 612, with a second portion of the packet in time and/or space that comes after the first portion (or at an expected location which may be known by the transmitter and receiver a priori, such as if fields are interleaved in the frequency domain) corresponding to the amount of time and/or space needed for a second STF field 612. If the correlation shows a match (e.g., if the correlation indicates the amount of match is above a threshold value) the receiving device determines the STF field 612 is repeated at least 2 times. If the correlation does not show a match (e.g., if the correlation indicates the amount of match is below a threshold value) the receiving device determines the STF field 612 is not repeated. Similarly, correlations may be carried on for additional portions (e.g., K portions) until a match is not found, to determine the number of times the STF field 612 is repeated. The correlations may be performed in serial or parallel. In a parallel scheme, testing for no repetition, 1 repetition, 2 repetitions, etc. is performed at the same time. Thus, the correlation may be performed more quickly, as opposed to checking for each number of possible repetitions serially.

In one aspect, as discussed above, the copies of the STF field 612 may be phase shifted (e.g., 90 degrees phase shift) or manipulations (e.g., multiplied by a number such as −1) of each other. The correlations performed may take account of this and search for such phase shifted and/or manipulated copies instead of exact copies.

In one aspect, the device receiving a packet determines partial bandwidth is used to transmit the packet by computing correlations in a received packet by testing different subsets of frequency ranges 802 in a given time segment 804 in a similar manner as discussed above. There may be a limited number of subsets of tones to be tested. The testing can be done in serial or parallel.

Figure 11:
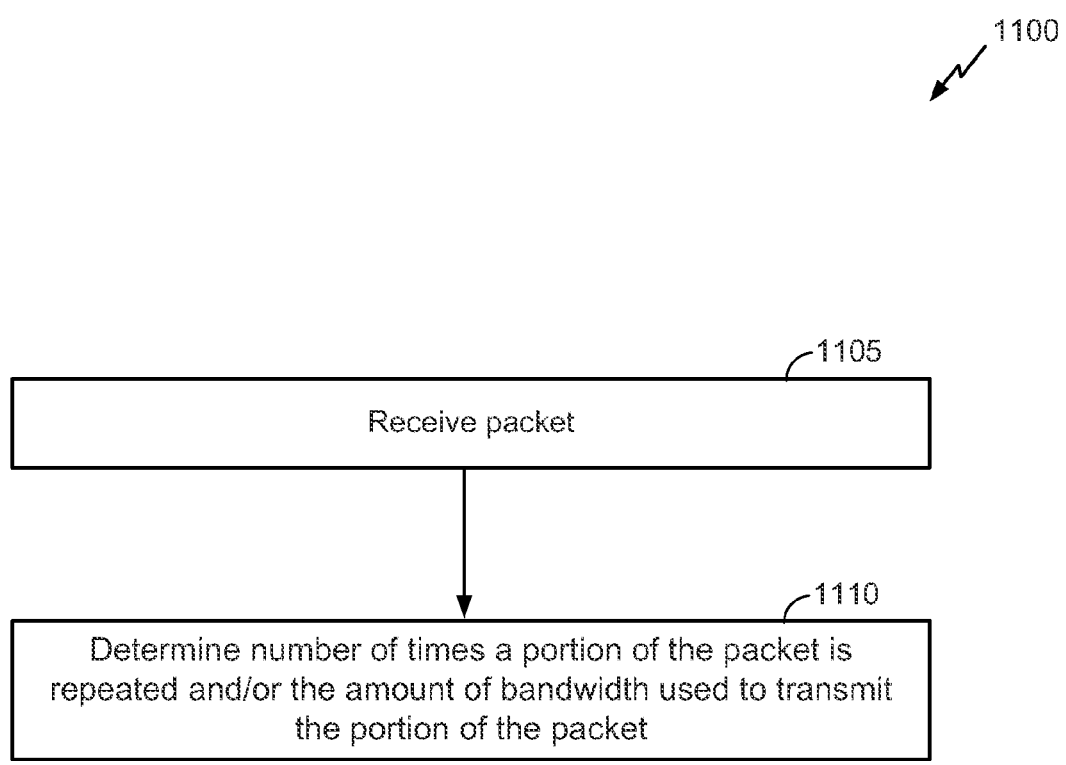
FIG. 11 illustrates an aspect of a method for determining the amount of repetition and/or fraction of the frequency ranges used for transmission of a packet.

FIG. 11 illustrates an aspect of a method 1100 for determining the amount of repetition and/or fraction of the frequency ranges 802 used for transmission of a packet. At 1105, a receiving device (e.g., another wireless device 202) receives a packet from the wireless device 202. At 1110, the receiving device correlates a first portion of the packet corresponding to a first field of the packet, with data in other portions in time and/or space of the packet to determine the number of times the first portion of the packet is repeated and/or the fraction of the frequency ranges 802 used for transmission of the packet.

Figure 12:
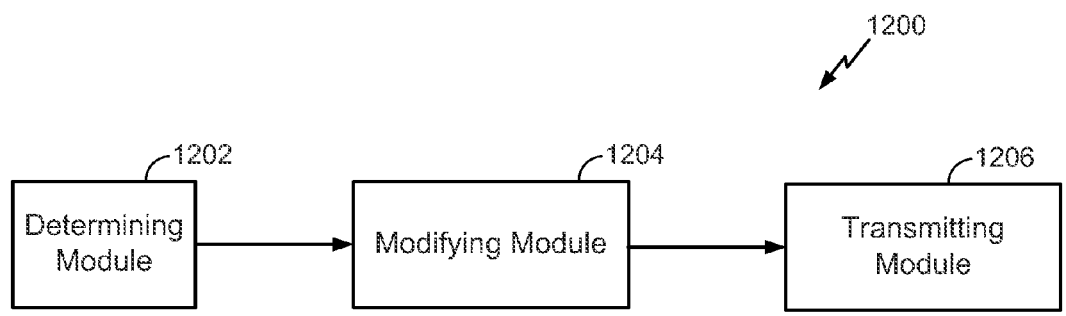
FIG. 12 is a functional block diagram of another exemplary wireless device.

FIG. 12 is a functional block diagram of another exemplary wireless device 1200 that may be employed within the wireless communication system 100. The device 1200 comprises a determining module 1202 for determining information identifying a characteristic of a communication channel. The determining module 1202 may be configured to perform one or more of the functions discussed above with respect to 905 and/or 1005 illustrated in FIGS. 9 and 10. The determining module 1202 may correspond to one or more of the processor 204 and the controller 224. The device 1200 further comprises a modifying module 1204 for modifying a number of times a portion of the packet is repeated in space and/or time and/or the fraction of bandwidth used to transmit the packet. The modifying module 1204 may be configured to perform one or more of the functions discussed above with respect to 930 and/or 1030 illustrated in FIGS. 9 and 10. The modifying module 1204 may correspond to one or more of the processor 204, the DSP 220, and the controller 224. The device 1200 further comprises a transmitting module 1206 for transmitting the packet. The transmitting module 1206 may be configured to perform one or more of the functions discussed above with respect to 915 and/or 1015 illustrated in FIGS. 9 and 10. The transmitting module 1206 may correspond to one or more of the processor 204 and the transmitter 210.

Figure 13:
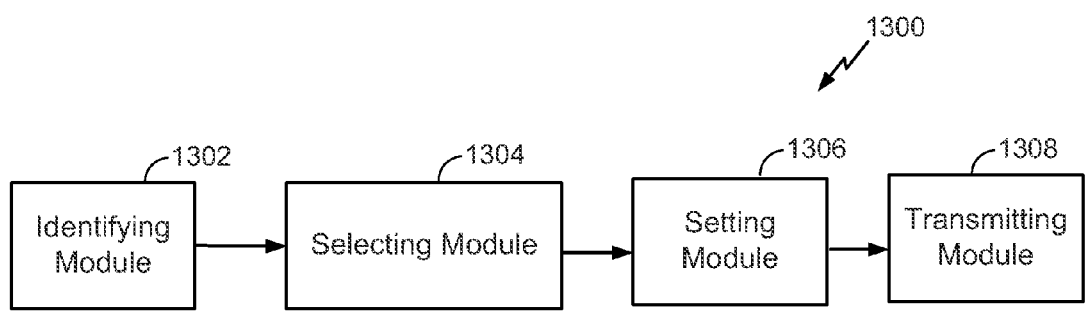
FIG. 13 is a functional block diagram of another exemplary wireless device.

FIG. 13 is a functional block diagram of another exemplary wireless device 1300 that may be employed within the wireless communication system 100. The device 1300 comprises an identifying module 1302 for identifying a number of tones to use for transmission of a packet in a time segment. The identifying module 1302 may be configured to perform one or more of the functions discussed above with respect to 1010 illustrated in FIG. 10. The identifying module 1302 may correspond to one or more of the processor 204 and the controller 224. The device 1300 further comprises a selecting module 1304 for selecting a subset of the identified tones to transmit a portion of the packet. The selecting module 1304 may be configured to perform one or more of the functions discussed above with respect to 1005, 1010, and/or 1030 illustrated in FIG. 10. The selecting module 1304 may correspond to one or more of the processor 204, the DSP 220, and the controller 224. The device 1300 further comprises a setting module 1306 for setting a transmit power for each of the subset of the identified tones based on a transmit power used for transmitting a packet over all tones in the time segment. The setting module 1306 may correspond to one or more of the processor 204, the DSP 220, and the controller 224. The device 1300 further comprises a transmitting module 1308 for transmitting the packet. The transmitting module 1308 may be configured to perform one or more of the functions discussed above with respect to 1015 illustrated in FIG. 10. The transmitting module 1306 may correspond to one or more of the processor 204 and the transmitter 210.

Figure 14:
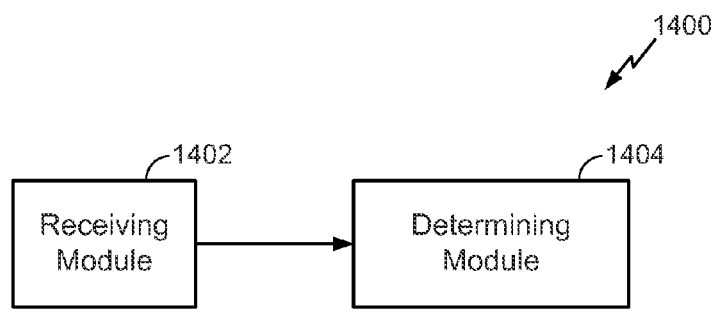
FIG. 14 is a functional block diagram of another exemplary wireless device.

FIG. 14 is a functional block diagram of another exemplary wireless device 1400 that may be employed within the wireless communication system 100. The device 1400 comprises a receiving module 1402 for receiving a packet. The receiving module 1402 may be configured to perform one or more of the functions discussed above with respect to 1105 illustrated in FIG. 11. The receiving module 1402 may correspond to one or more of the processor 204 and the receiver 212. The device 1400 further comprises a determining module 1404 for determining a number of times a portion of the packet is repeated in space and/or time and/or the fraction of bandwidth used to transmit the packet. The determining module 1404 may be configured to perform one or more of the functions discussed above with respect to 1110 illustrated in FIG. 11. The determining module 1404 may correspond to one or more of the processor 204, the DSP 220, and the controller 224.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of a list" of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for wireless communication, the method comprising:
    transmitting, over a communication channel, a first packet comprising a training sequence repeated a number of times and a first data portion;
    determining information identifying a characteristic of the communication channel, the characteristic indicating a quality of the communication channel;
    determining an increased or decreased indication of whether a second packet transmitted over the communication channel is decodable by a receiver based on the characteristic indicating the quality of the communication channel;
    determining whether a modulation rate for the second packet satisfies a threshold modulation rate;
    modifying the number of times to repeat the training sequence in the second packet based on the increased or decreased indication of whether the second packet transmitted over the communication channel is decodable and further based on determining whether the modulation rate satisfies the threshold modulation rate, the training sequence comprising at least one or more of a short training field or a long training field, wherein the number of times to repeat the training sequence is modified by increasing or decreasing the number of times to repeat the training sequence; and
    transmitting the second packet comprising the training sequence repeated the modified number of times and a second data portion.

2. The method of claim 1, wherein the training sequence is repeated in the time-domain.

3. The method of claim 1, wherein the training sequence is repeated in the frequency-domain.

4. The method of claim 3, wherein the training sequence is repeated over a contiguous frequency range.

5. The method of claim 3, wherein the training sequence is repeated over a non-contiguous frequency range.

6. The method of claim 1, wherein the training sequence is repeated in the time-domain and the frequency-domain.

7. The method of claim 1, wherein the second data portion is repeated based on the determined information.

8. The method of claim 1, wherein a coding rate of the second packet is adjusted based on the determined information.

9. The method of claim 1, wherein the training sequence comprises the short training field and the long training field.

10. The method of claim 1, further comprising modifying a second number of times to repeat a signal field in the second packet based on the determined information.

11. A method for wireless communication, the method comprising:
    receiving, over a communication channel, a first packet comprising a training sequence repeated a number of times and a first data portion;
    receiving, over the communication channel, a second packet comprising the training sequence repeated a modified number of times and a second data portion, the number of times the training sequence is repeated in the second packet being modified by increasing or decreasing the number of times to repeat the training sequence based on a determination of an increased or decreased indication of whether the second packet transmitted over the communication channel is decodable and further based on a determination of whether a modulation rate for the second packet satisfies a threshold modulation rate, wherein the training sequence comprises at least one or more of a short training field or a long training field; and
    determining the modified number of times the training sequence is repeated in the second packet.

12. The method of claim 11, wherein the training sequence is repeated in the time-domain.

13. The method of claim 11, wherein the training sequence is repeated in the frequency-domain.

14. The method of claim 13, wherein the training sequence is repeated over a contiguous frequency range.

15. The method of claim 13, wherein the training sequence is repeated over a non-contiguous frequency range.

16. The method of claim 11, wherein the training sequence is repeated in the time-domain and the frequency-domain.

17. The method of claim 11, wherein the training sequence comprises the short training field and the long training field.

18. The method of claim 11, further comprising determining a second number of times at least one or more of a signal field or the second data portion is repeated based on the determined modified number of times the training sequence is repeated in the second packet.

19. The method of claim 11, further comprising determining a frequency range over which the second packet is received based on the determined modified number of times the training sequence is repeated in the second packet.

20. The method of claim 11, further comprising transmitting a request to a wireless device that transmitted the first packet, the request including a request to repeat portions of packets transmitted.

21. The method of claim 20, wherein transmitting the request is based on determination of a channel characteristic of the communication channel over which the first packet is received.

22. The method of claim 11, wherein determining the modified number of times the training sequence is repeated in the second packet comprises comparing a correlation property of the training sequence over multiple time segments or frequency ranges.

23. An apparatus for wireless communication, the apparatus comprising:
a transmitter configured to transmit, over a communication channel, a first packet comprising a training sequence repeated a number of times and a first data portion;
a processor configured to:
determine information identifying a characteristic of the communication channel, the characteristic indicating a quality of the communication channel;
determine an increased or decreased indication of whether a second packet transmitted over the communication channel is decodable by a receiver based on the characteristic indicating the quality of the communication channel;
determine whether a modulation rate for the second packet satisfies a threshold modulation rate; and
modify the number of times to repeat the training sequence in the second packet based on the increased or decreased indication of whether the second packet transmitted over the communication channel is decodable and further based on determining whether the modulation rate satisfies the threshold modulation rate, the training sequence comprising at least one or more of a short training field or a long training field, wherein the number of times to repeat the training sequence is modified by increasing or decreasing the number of times to repeat the training sequence; and
wherein the transmitter is configured to transmit the second packet comprising the training sequence repeated the modified number of times and a second data portion.

24. The apparatus of claim 23, wherein the training sequence is repeated in the time-domain.

25. The apparatus of claim 23, wherein the training sequence is repeated in the frequency-domain.

26. The apparatus of claim 25, wherein the training sequence is repeated over a contiguous frequency range.

27. The apparatus of claim 25, wherein the training sequence is repeated over a non-contiguous frequency range.

28. The apparatus of claim 23, wherein the training sequence is repeated in the time-domain and the frequency-domain.

29. The apparatus of claim 23, wherein the second data portion is repeated based on the determined information.

30. The apparatus of claim 23, wherein a coding rate of the second packet is adjusted based on the determined information.

31. The apparatus of claim 23, wherein the training sequence comprises the short training field and the long training field.

32. The apparatus of claim 23, wherein the processor is further configured to modify a second number of times to repeat a signal field in the second packet based on the determined information.

33. An apparatus for wireless communication, the apparatus comprising:
a receiver configured to:
receive, over a communication channel, a first packet comprising a training sequence repeated a number of times and a first data portion; and
receive, over the communication channel, a second packet comprising the training sequence repeated a modified number of times and a second data portion, the number of times the training sequence is repeated in the second packet being modified by increasing or decreasing the number of times to repeat the training sequence based on a determination of an increased or decreased indication of whether the second packet transmitted over the communication channel is decodable and further based on a determination of whether a modulation rate for the second packet satisfies a threshold modulation rate, wherein the training sequence comprises at least one or more of a short training field or a long training field; and
a processor configured to determine the modified number of times the training sequence is repeated in the second packet.

34. The apparatus of claim 33, wherein the training sequence is repeated in the time-domain.

35. The apparatus of claim 33, wherein the training sequence is repeated in the frequency-domain.

36. The apparatus of claim 35, wherein the training sequence is repeated over a contiguous frequency range.

37. The apparatus of claim 36, wherein the training sequence is repeated over a non-contiguous frequency range.

38. The apparatus of claim 33, wherein the training sequence is repeated in the time-domain and the frequency-domain.

39. The apparatus of claim 33, wherein the training sequence comprises the short training field and the long training field.

40. The apparatus of claim 33, wherein the processor is further configured to determine a second number of times at least one or more of a signal field or the second data portion is repeated based on the determined modified number of times the training sequence is repeated in the second packet.

41. The apparatus of claim 33, wherein the processor is further configured to determine a frequency range over which the second packet is received based on the determined modified number of times the training sequence is repeated in the second packet.

42. The apparatus of claim 33, further comprising a transmitter configured to transmit a request to a wireless device that transmitted the first packet, the request including a request to repeat portions of packets transmitted.

43. The apparatus of claim 42, wherein transmitting the request is based on determination of a channel characteristic of the communication channel over which the first packet is received.

44. The apparatus of claim 33, wherein determining the modified number of times the training sequence is repeated in the second packet comprises comparing a correlation property of the training sequence over multiple time segments or frequency ranges.

45. An apparatus for wireless communication, the apparatus comprising:
means for transmitting, over a communication channel, a first packet comprising a training sequence repeated a number of times and a first data portion;
means for determining information identifying a characteristic of the communication channel, the characteristic indicating a quality of the communication channel;
means for determining an increased or decreased indication of whether a second packet transmitted over the communication channel is decodable by a receiver based on the characteristic indicating the quality of the communication channel;
means for determining whether a modulation rate for the second packet satisfies a threshold modulation rate;
means for modifying the number of times to repeat the training sequence in the second packet based on the increased or decreased indication of whether the second packet transmitted over the communication channel is decodable and further based on determining whether the modulation rate satisfies the threshold modulation rate, the training sequence comprising at least one or more of a short training field or a long training field, wherein the number of times to repeat the training sequence is modified by increasing or decreasing the number of times to repeat the training sequence; and means for transmitting the second packet comprising the training sequence repeated the modified number of times and a second data portion.

46. The apparatus of claim 45, wherein the training sequence is repeated in the time-domain.

47. The apparatus of claim 45, wherein the training sequence is repeated in the frequency-domain.

48. The apparatus of claim 47, wherein the training sequence is repeated over a contiguous frequency range.

49. The apparatus of claim 47, wherein the training sequence is repeated over a non-contiguous frequency range.

50. The apparatus of claim 45, wherein the training sequence is repeated in the time-domain and the frequency-domain.

51. The apparatus of claim 45, wherein the second data portion is repeated based on the determined information.

52. The apparatus of claim 45, wherein a coding rate of the second packet is adjusted based on the determined information.

53. The apparatus of claim 45, wherein the training sequence comprises the short training field and the long training field.

54. The apparatus of claim 45, further comprising means for modifying a second number of times to repeat a signal field in the second packet based on the determined information.

55. An apparatus for wireless communication, the apparatus comprising:
  means for receiving, over a communication channel, a first packet comprising a training sequence repeated a number of times and a first data portion;
  means for receiving, over the communication channel, a second packet comprising the training sequence repeated a modified number of times and a second data portion, the number of times the training sequence is repeated in the second packet being modified by increasing or decreasing the number of times to repeat the training sequence based on a determination of an increased or decreased indication of whether the second packet transmitted over the communication channel is decodable and further based on a determination of whether a modulation rate for the second packet satisfies a threshold modulation rate, wherein the training sequence comprises at least one or more of a short training field or a long training field; and
  means for determining the modified number of times the training sequence is repeated in the second packet.

56. The apparatus of claim 55, wherein the training sequence is repeated in the time-domain.

57. The apparatus of claim 55, wherein the training sequence is repeated in the frequency-domain.

58. The apparatus of claim 57, wherein the training sequence is repeated over a contiguous frequency range.

59. The apparatus of claim 57, wherein the training sequence is repeated over a non-contiguous frequency range.

60. The apparatus of claim 55, wherein the training sequence is repeated in the time-domain and the frequency-domain.

61. The apparatus of claim 55, wherein the training sequence comprises the short training field and the long training field.

62. The apparatus of claim 55, further comprising means for determining a second number of times at least one or more of a signal field or the second data portion is repeated based on the determined modified number of times the training sequence is repeated in the second packet.

63. The apparatus of claim 55, further comprising means for determining a frequency range over which the second packet is received based on the determined modified number of times the training sequence is repeated in the second packet.

64. The apparatus of claim 55, further comprising means for transmitting a request to a wireless device that transmitted the first packet, the request including a request to repeat portions of packets transmitted.

65. The apparatus of claim 64, wherein transmitting the request is based on determination of a channel characteristic of the communication channel over which the first packet is received.

66. The apparatus of claim 55, wherein determining the modified number of times the training sequence is repeated in the second packet comprises comparing a correlation property of the training sequence over multiple time segments or frequency ranges.

67. A non-transitory computer readable medium comprising instructions that when executed cause an apparatus to perform a method of wireless communication, the method comprising:
  transmitting, over a communication channel, a first packet comprising a training sequence repeated a number of times and a first data portion;
  determining information identifying a characteristic of the communication channel, the characteristic indicating a quality of the communication channel;
  determining an increased or decreased indication of whether a second packet transmitted over the communication channel is decodable by a receiver based on the characteristic indicating the quality of the communication channel;
  determining whether a modulation rate for the second packet satisfies a threshold modulation rate;
  modifying the number of times to repeat the training sequence in the second packet based on the increased or decreased indication of whether the second packet transmitted over the communication channel is decodable and further based on determining whether the modulation rate satisfies the threshold modulation rate, the training sequence comprising at least one or more of a short training field or a long training field, wherein the number of times to repeat the training sequence is modified by increasing or decreasing the number of times to repeat the training sequence; and
  transmitting the second packet comprising the training sequence repeated the modified number of times and a second data portion.

68. The non-transitory computer readable medium of claim 67, wherein the training sequence is repeated in the time-domain.

69. The non-transitory computer readable medium of claim 67, wherein the training sequence is repeated in the frequency-domain.

70. The non-transitory computer readable medium of claim 69, wherein the training sequence is repeated over a contiguous frequency range.

71. The non-transitory computer readable medium of claim 69, wherein the training sequence is repeated over a non-contiguous frequency range.

72. The non-transitory computer readable medium of claim 67, wherein the training sequence is repeated in the time-domain and the frequency-domain.

73. The non-transitory computer readable medium of claim 67, wherein the second data portion is repeated based on the determined information.

74. The non-transitory computer readable medium of claim 67, wherein a coding rate of the second packet is adjusted based on the determined information.

75. The non-transitory computer readable medium of claim 67, wherein the training sequence comprises the short training field and the long training field.

76. The non-transitory computer readable medium of claim 67, wherein the method further comprises modifying a second number of times to repeat a signal field in the second packet based on the determined information.

77. A non-transitory computer readable medium comprising instructions that when executed cause an apparatus to perform a method of wireless communication, the method comprising:
receiving, over a communication channel, a first packet comprising a training sequence repeated a number of times and a first data portion;
receiving, over the communication channel, a second packet comprising the training sequence repeated a modified number of times and a second data portion, the number of times the training sequence is repeated in the second packet being modified by increasing or decreasing the number of times to repeat the training sequence based on a determination of an increased or decreased indication of whether the second packet transmitted over the communication channel is decodable and further based on a determination of whether a modulation rate for the second packet satisfies a threshold modulation rate, wherein the training sequence comprises at least one or more of a short training field or a long training field; and
determining the modified number of times the training sequence is repeated in the second packet.

78. The non-transitory computer readable medium of claim 77, wherein the training sequence is repeated in the time-domain.

79. The non-transitory computer readable medium of claim 77, wherein the training sequence is repeated in the frequency-domain.

80. The non-transitory computer readable medium of claim 79, wherein the training sequence is repeated over a contiguous frequency range.

81. The non-transitory computer readable medium of claim 79, wherein the training sequence is repeated over a non-contiguous frequency range.

82. The non-transitory computer readable medium of claim 77, wherein the training sequence is repeated in the time-domain and the frequency-domain.

83. The non-transitory computer readable medium of claim 77, wherein the training sequence comprises the short training field and the long training field.

84. The non-transitory computer readable medium of claim 77, wherein the method further comprises determining a second number of times at least one or more of a signal field or the second data portion is repeated based on the determined modified number of times the training sequence is repeated in the second packet.

85. The non-transitory computer readable medium of claim 77, wherein the method further comprises determining a frequency range over which the second packet is received based on the determined modified number of times the training sequence is repeated in the second packet.

86. The non-transitory computer readable medium of claim 77, wherein the method further comprises transmitting a request to a wireless device that transmitted the first packet, the request including a request to repeat portions of packets transmitted.

87. The non-transitory computer readable medium of claim 86, wherein transmitting the request is based on determination of a channel characteristic of the communication channel over which the first packet is received.

88. The non-transitory computer readable medium of claim 77, wherein determining the modified number of times the training sequence is repeated in the second packet comprises comparing a correlation property of the training sequence over multiple time segments or frequency ranges.

* * * * *